US008131413B2

(12) United States Patent  
Yuan

(10) Patent No.: US 8,131,413 B2  
(45) Date of Patent: Mar. 6, 2012

(54) ELECTRIC MOTOR AND CONVERSION SYSTEM FOR MANUALLY POWERED VEHICLES

(75) Inventor: Max Yuan, Mesa, AZ (US)

(73) Assignee: Max Power Motors, LLC, Tempe, AZ (US)

( * ) Notice: Subject to any disclaimer, the term of this patent is extended or adjusted under 35 U.S.C. 154(b) by 1137 days.

(21) Appl. No.: 11/904,222

(22) Filed: Sep. 25, 2007

(65) Prior Publication Data

US 2009/0082914 A1    Mar. 26, 2009

(51) Int. Cl.
*H02K 21/00* (2006.01)
*H02K 3/00* (2006.01)
*B60L 11/00* (2006.01)

(52) U.S. Cl. .......... 701/22; 701/1; 180/65.1; 180/65.31; 180/65.51; 180/218; 180/220; 310/49.04; 310/49.53; 310/67 A; 310/156.01; 310/156.35; 310/156.36; 310/179; 310/180; 310/181; 310/198

(58) Field of Classification Search ................ 701/1, 22; 180/65.1, 65.31, 65.51, 218, 220; 310/49.04, 310/49.23, 49.53, 49.54, 67 R, 67 A, 68 R, 310/109, 156.01, 156.35, 156.36, 177, 179–181, 310/198, 268

See application file for complete search history.

(56) References Cited

U.S. PATENT DOCUMENTS

| | | | |
|---|---|---|---|
| 4,910,423 A | 3/1990 | Werber | |
| 4,922,145 A | 5/1990 | Shtipelman | |
| 5,229,677 A | 7/1993 | Dade et al. | |
| 5,369,323 A * | 11/1994 | Allwine, Jr. | 310/49.54 |
| 5,788,007 A * | 8/1998 | Miekka | 180/205 |
| 6,011,337 A | 1/2000 | Lin et al. | |
| 6,278,216 B1 | 8/2001 | Li | |
| 6,320,290 B1 | 11/2001 | Kanebako et al. | |
| 6,437,529 B1 * | 8/2002 | Brown | 318/400.26 |
| 6,445,105 B1 * | 9/2002 | Kliman et al. | 310/268 |
| 6,452,302 B1 | 9/2002 | Tajima et al. | |
| 6,664,692 B1 | 12/2003 | Kristoffersen | |
| 6,753,631 B2 | 6/2004 | Kanebako et al. | |
| 6,802,385 B2 | 10/2004 | Pyntikov et al. | |
| 6,812,661 B2 | 11/2004 | Maslov et al. | |
| 6,822,368 B2 | 11/2004 | Maslov et al. | |
| 6,844,645 B2 | 1/2005 | Maslov et al. | |
| 6,995,494 B2 | 2/2006 | Haugan et al. | |

(Continued)

FOREIGN PATENT DOCUMENTS

JP    6245458 A  *  9/1994

(Continued)

*Primary Examiner* — John Nguyen  
*Assistant Examiner* — Chuong Nguyen  
(74) *Attorney, Agent, or Firm* — Etherton Law Group, LLC; Ann Marie W. Whitley; Benjamin D. Tietgen

(57) ABSTRACT

An electric motor and conversion system includes a direct current power source, a rotor with two sides and two series of permanent magnets alternating in polarity, two stators on opposing sides of the rotor where each stator has a series of winding coils, magnet position identifiers, and a control system comprising a sensor that cooperates with the magnet position identifiers and a microcontroller to individually controls winding drivers. Preferably, the number of magnets on the rotor does not equal the number of winding coils on the stators. Also preferably, the magnet position identifiers are a series of apertures on the rotor through which signals pass. The conversion system can also include connectors for connecting to an axle, a removable throttle, and electric cables for electrically connecting the components.

11 Claims, 9 Drawing Sheets

U.S. PATENT DOCUMENTS

| | | |
|---|---|---|
| 7,017,696 B2 | 3/2006 | Pal |
| 2003/0193264 A1 | 10/2003 | Pyntikov et al. |
| 2005/0017596 A1 | 1/2005 | Naito et al. |
| 2005/0073213 A1 | 4/2005 | Naito et al. |
| 2006/0061230 A1 | 3/2006 | Klippert |
| 2006/0103263 A1 | 5/2006 | Naito et al. |
| 2006/0131986 A1* | 6/2006 | Hsu et al. .................. 310/268 |
| 2006/0152104 A1 | 7/2006 | Hino et al. |
| 2008/0246429 A1* | 10/2008 | Atarashi et al. ............ 318/772 |

FOREIGN PATENT DOCUMENTS

| | | |
|---|---|---|
| JP | 10271784 A * | 10/1998 |
| JP | 2001136721 A * | 5/2001 |

* cited by examiner

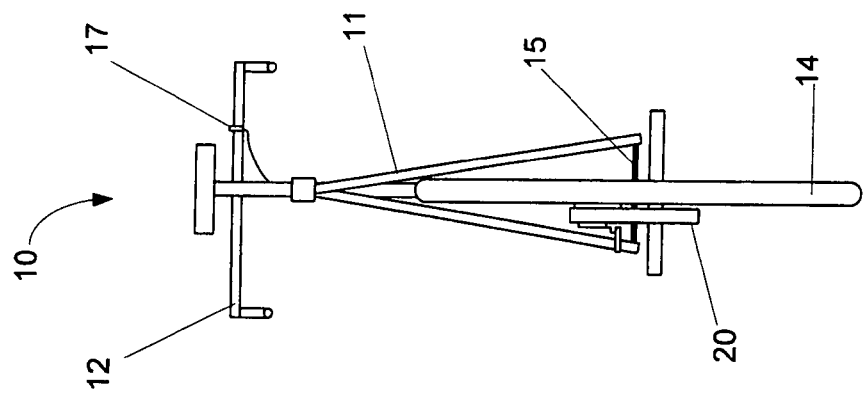
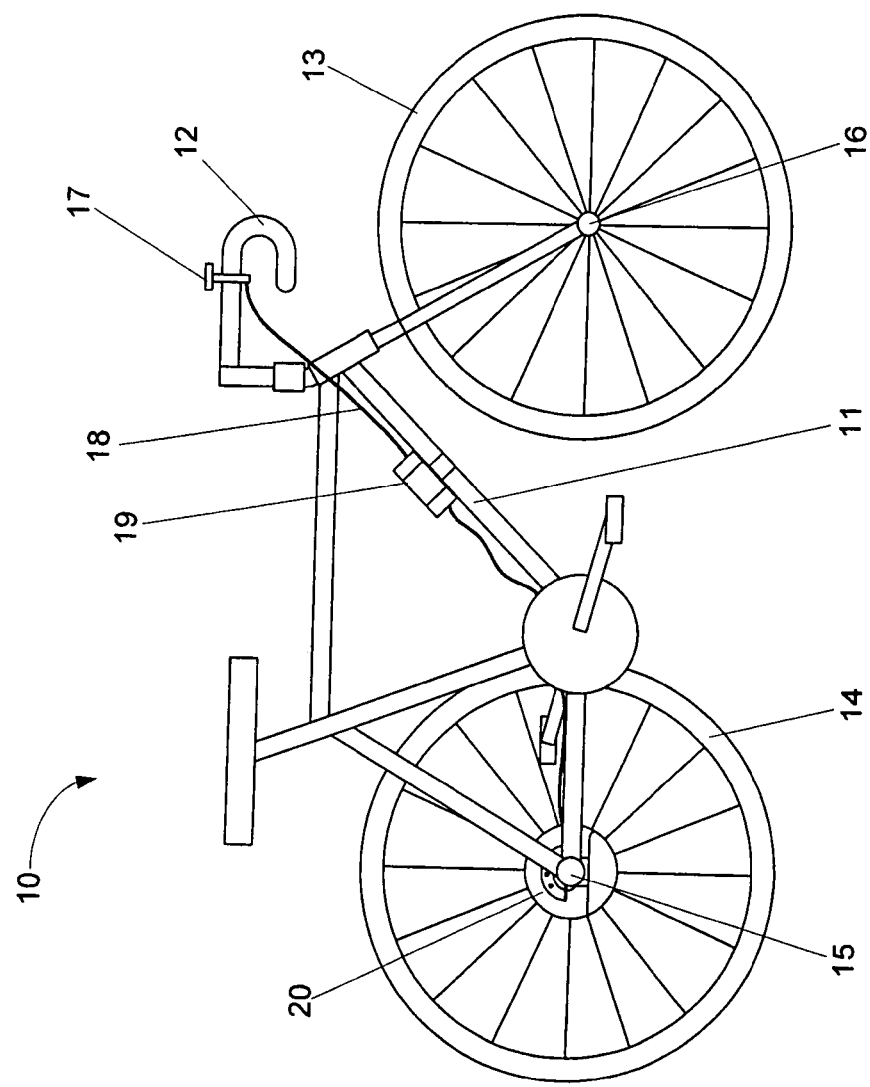

Fig. 7
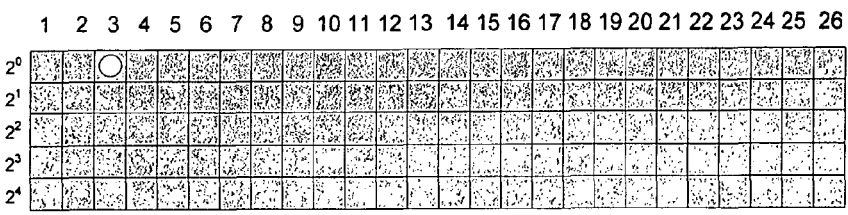
(a) Detected Magnet 1 in 3rd Column
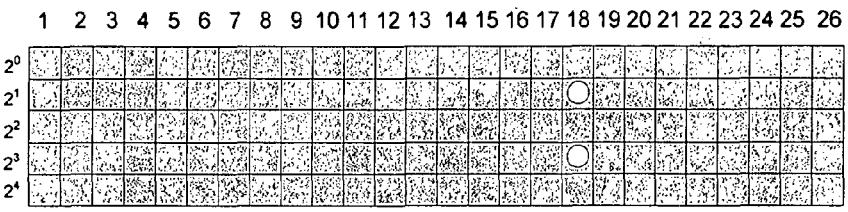
(b) Detected Magnet 10 in 18th Column
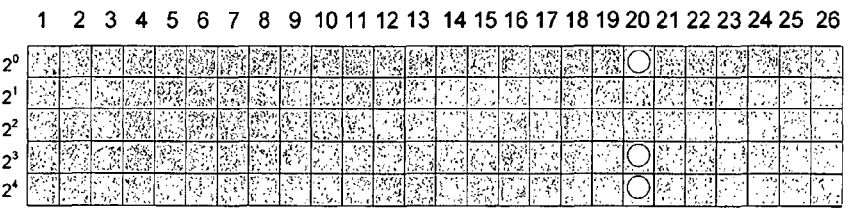
(c) Detected Magnet 25 in 20th Column
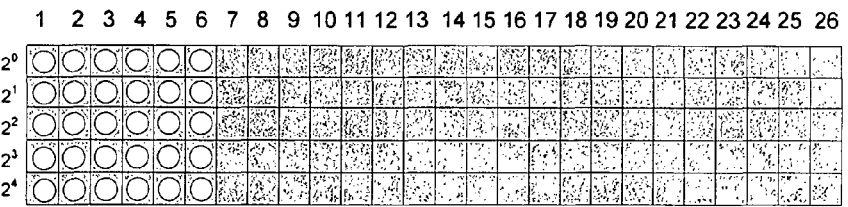
(d) Detected Opening in 1-6th Columns

ELECTRIC MOTOR AND CONVERSION SYSTEM FOR MANUALLY POWERED VEHICLES

FIELD OF INVENTION

This invention relates to electric motors for traditionally manually powered vehicles. This invention relates particularly to a system for converting a traditional bicycle into an electric vehicle using a permanent magnet DC electric motor.

BACKGROUND

Worldwide, over two billion people use bicycles as their primary mode of transportation every day. In the United States, over 200 million people own bicycles. Recently, bicycles have resurged in popularity due to increasing gasoline prices with more bicycles being produced than automobiles each year. Bicycles are also popular in many developing countries, partly because gasoline and automobiles are very expensive and unaffordable for the majority of the nation.

Traditionally, bicycles have been propelled by the bicycle rider's pedaling. People have a desire to travel to places faster with minimum physical labor, however. Therefore, it would be desirable to power a bicycle with an electric motor, thereby turning an otherwise manually-powered bicycle into an electric vehicle. This would make a bicycle rider's daily commute more enjoyable in an environmentally friendly way.

In general, an electric motor converts electrical energy into mechanical motion. Typical electric motors include a rotor that rotates and a stator that remains stationary. The rotor incorporates fixed magnets, and the stator incorporates energized coils. When the coils are energized, a force is generated perpendicular to both the coil and the magnetic field, which is characterized by the Lorentz force law $F=q(v \times B)$. The rotor rotates because the coils and magnetic field are arranged so that torque is generated about the rotor axis. The two main types of electric motors are direct current (DC) and alternating current (AC) motors. Most electric motors in transportation have been AC motors because of the higher maintenance cost of replacing the DC brush. Brushless DC permanent magnet motors are becoming popular, however, because they have a high startup torque, simpler speed control, and greater energy efficiency than AC motors.

For use with bicycles, DC permanent magnet motors present a few challenges. For example, typical DC permanent magnet motors are efficient at only one speed and experience electromagnetic interference when powering on and off. Additionally, typical DC permanent magnet motors experience cogging torque, which causes the motor to lock up when the power is switched off rather than allowing for a smooth natural deceleration. Accordingly, it would be desirable to design a DC electric motor with a control system that maximizes the motor's efficiency at any bicycle speed and reduces electromagnetic interference. It also would be desirable to design the motor so that cogging torque is minimized, allowing a bicycle rider to smoothly decelerate when coming to a stop.

Another drawback of typical DC permanent magnet motors for use with bicycles is that their circular architecture requires them to be permanently attached to the bicycle. Accordingly, consumers are required to purchase a new specialized bicycle, which can be prohibitively expensive. Moreover, if the motor needs repair or maintenance, a bicycle rider cannot simply remove the motor system and continue to ride his or her bicycle using the pedals. It would therefore be desirable to design a DC electric motor that can be quickly and easily removed from the bicycle.

Ultimately, to convert a traditional bicycle to an electric vehicle, it would be desirable to provide an entire electric motor conversion system that is lightweight, portable, and produces zero emissions and noise. Additionally, it would be desirable to design the electric motor conversion system so that it maximizes performance at any given speed and minimizes cogging torque when decelerating. Finally, it would be desirable to provide an electric motor conversion system that is compatible with existing bicycle designs, allowing the consumer to quickly convert a conventional bicycle to an electric vehicle.

SUMMARY OF THE INVENTION

The present invention is an electric motor and conversion system that incorporates a portable and removable energy efficient permanent magnet direct current electric motor for transportation. The system can be installed on a conventional bicycle, creating an electric bicycle that operates substantially like a manually-powered bicycle except without the need for pedaling.

The electric motor includes a direct current power source, a rotor with two series of permanent magnets alternating in polarity, two stators on opposing sides of the rotor each stator having a series of winding coils, magnet positioning identifiers, and a control system. Additionally, the electric motor includes gaps in the rotor and stators allowing the motor to be installed on the rear axle of a bicycle near the rear wheel. A connector attaches the rotor to the rear wheel so that when the rotor rotates, the rear wheel also rotates. Another connector can attach one of the stators to the bicycle frame to keep substantially stationary the stator and the other components not intended to rotate. To improve performance, the number of magnets on the rotor does not equal the number of winding coils on the stators. Also to improve performance, the control system includes a sensor that records input from the magnet position identifiers and a microcontroller to process the input and individually control the winding coils to precisely regulate the operation of the motor in response to the input. The magnet position identifiers, in the preferred embodiment, are patterns of apertures on the rotor through which light passes from a light source on one stator to the sensor near the other stator. The apertures are preferably organized into binary number patterns.

The conversion system for a bicycle consists of a throttle that can be attached to the handlebars of a bicycle or to another position on the frame, the power source, the electric motor, and cables to electrically connect the components. The control system and microcontroller can also detect signals from the throttle and adjust the speed of the rotor accordingly. The system can be installed on a traditional bicycle to convert it to an electric vehicle without having to remove the bicycle wheel or other bicycle components.

The features, aspects, and advantages of the present invention will become fully apparent from the following detailed drawings, description of illustrative embodiments and appended claims.

BRIEF DESCRIPTION OF THE DRAWINGS

FIG. 1a is a side view of the present invention attached to the rear wheel of a bicycle.

FIG. 1b is a rear view of the present invention attached to the rear wheel of a bicycle.

FIG. 7 illustrates the relationship between light that reaches the sensor and magnet position identifiers.

DETAILED DESCRIPTION OF THE INVENTION

Figure 2A:
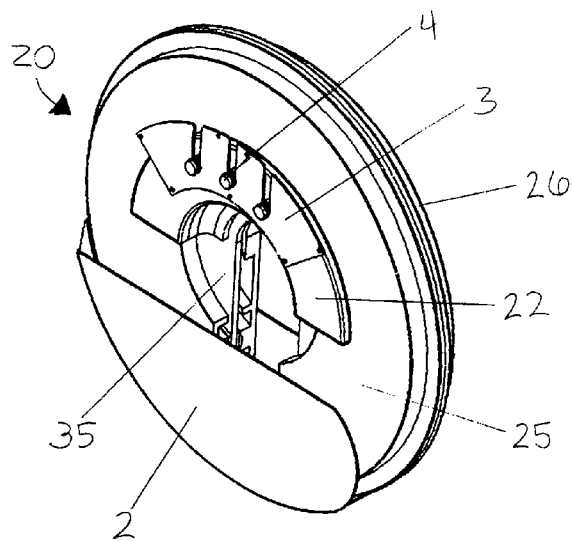
FIG. 2a is a perspective view of inner side of the electric motor of the present invention, showing a removable cover, a motor-to-wheel connector, and the body of the motor.
Figure 2B:
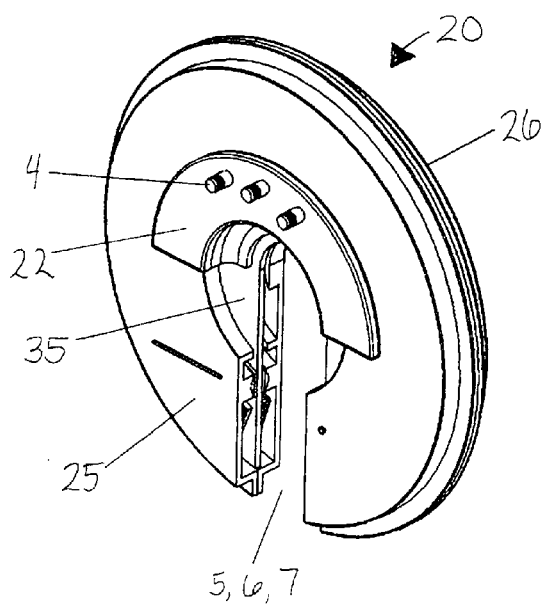
FIG. 2b is a perspective view of inner side of the electric motor of the present invention.
Figure 2C:
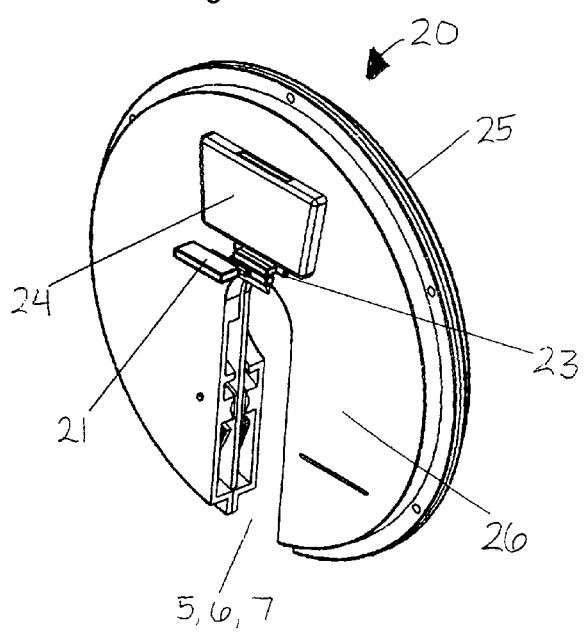
FIG. 2c is a perspective view of the outer side of the electric motor of the present invention.

The present invention is an electric motor and conversion system that incorporates a portable and removable energy efficient permanent magnet direct current (DC) electric motor for transportation. The system can be installed on a conventional bicycle to create an electric bicycle that operates substantially like a manually-powered bicycle except without the need for pedaling. The system can also be used on any vehicle having wheels and an axle, such as a tricycle, a unicycle, or a scooter. For illustrative purposes, however, this invention will be described with respect to a bicycle. It will be apparent to someone skilled in the art how to apply this invention to other types of transportation.

FIG. 1 generally depicts the electric motor and conversion system in use on an ordinary bicycle 10. Bicycle 10 comprises a front wheel 13 and rear wheel 14 coupled to a frame 11 through a front axle 16 and rear axle 15 at the front fork and rear fork, respectively. Also coupled to frame 11 are handlebars 12 and a seat. The conversion system includes a throttle 17, electric cables 18, a power source 19, and a motor 20. The traditional propulsion for the bicycle, namely the pedal and chain gear coupled with the rear wheel 14, may also be present.

In the preferred embodiment, throttle 17 removably attaches to handlebars 12. Throttle 17 can be any type of hand-operated throttle, such as a pressure sensitive button, and preferably is positioned such that a bicycle rider can control throttle 17 while still being able to steer the bicycle. Additionally, throttle 17 is preferably secured to the handlebars with brackets. Alternatively, simple screws and nuts can be used to secure throttle 17 to handlebars 12. Other methods of securing throttle 17 to the handlebars 12 are acceptable, however, as is well known to those skilled in the art. Throttle 17 can be installed on other parts of a bicycle frame 11 as well, as is known in the art.

DC power source 19 removably attaches to frame 11 by placing or securing it in the bicycle water bottle receptacle. Alternatively, it can be secured to frame 11 with brackets or any other conventional attachment means as is known in the art. Additionally, power source 19 can be placed on frame 11 anywhere that a bicycle rider finds it convenient and comfortable. Power source 19 is preferably a 12 or 24 volt battery. Also preferably, power source 19 is a rechargeable power source, such as a lead acid battery or a lithium ion battery. In an alternative embodiment, the power source can be replaced with a solar power generator or fuel cell.

Electric cables 18 electrically connect throttle 17, power source 19, and motor 20 such that when a bicycle rider controls the throttle, signals are sent through electric cables 18 to motor 20 so that motor 20 processes the signals and controls the rotor and consequently the rear wheel 14 appropriately. This permits a bicycle rider to control the speed and to accelerate and decelerate slowly or quickly depending on his or her needs.

FIGS. 2a-5 illustrate the components of motor 20 in more detail. Referring to FIG. 2a, FIG. 2b, and FIG. 2c, electric motor 20 comprises a rotor disk 35, a first stator housing 25, a second stator housing 26, an optional removable cover 2, a motor-to-wheel connector having a rotor connector 22 with protrusions 4 and a wheel connector 3, a motor-to-frame connector having a stator connector 23 and a frame connector 21, and a control box 24. As shown in FIGS. 2a and 2b, motor 20 is generally annular shaped with a gap in one area thereby enabling it to be positioned over the rear axle of any bicycle. Preferably, the periphery of motor 20 has a substantially circular shape. In an alternative embodiment, motor 20 can include a water resistant casing, and motor 20 can be slightly curved to ease installation. Also preferably, motor 20 is evenly weighted such that when positioned on a bicycle, it is sufficiently balanced that it is inclined to spin about the axle.

Figure 3A:
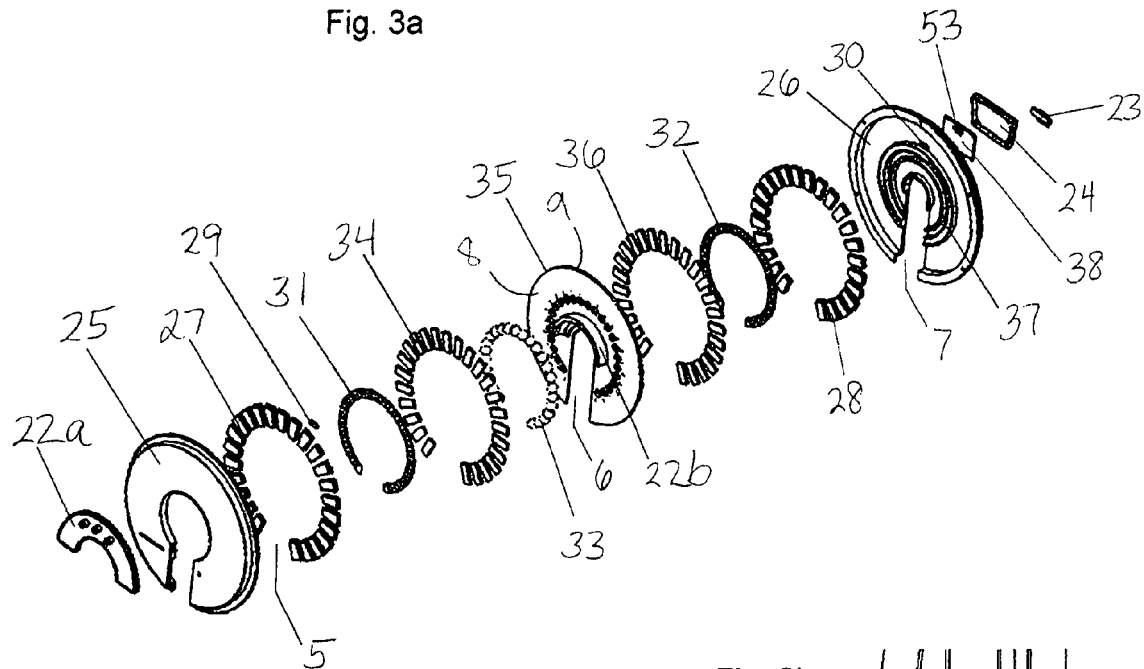
FIG. 3a is an exploded view of the motor.

FIG. 3a is an exploded view of motor 20 without removable cover 2. As shown in FIG. 3a, a first stator comprises first stator housing 25 on which a first plurality of winding coils 27 are mounted in spaced relation around the circumference. The first plurality of winding coils 27 are preferably made of copper and secured with adhesive to the first stator housing 25. First stator housing 25 is generally annular in shape with a first stator gap 5. The first stator gap 5 is preferably large enough to accommodate a standard size bicycle rear axle. First stator housing 25 also includes a bearing track (not shown) integral with housing 25 for cooperating with a series of ball bearings 33.

Second stator comprises a second stator housing 26 on which a second plurality of winding coils 28 are also mounted in spaced relation around the circumference, as shown in FIG. 3a. Preferably, there is the same number of winding coils on second stator housing 26 as there are on first stator housing 25. As with the first plurality of winding coils 27, the second plurality of winding coils 28 are also preferably made of copper and secured with adhesive to stator housing 26. Second stator housing 26 is generally annular in shape with a second stator gap 7. The second stator gap 7 is preferably large enough to accommodate a standard size bicycle rear axle. Second stator housing 26 also includes a bearing track 37 integral with housing 26 for cooperating with a series of ball bearings. The winding coils on the first and second stators are referred to herein collectively as stator winding coils.

Also shown in FIG. 3a, a light source 29, or any signal source, attaches to first stator housing 25 and an opening 30 is left at the corresponding location on second stator housing 26, so that light, or a signal, emitted from stator housing 25 can pass through opening 30 on second stator housing 26 and reach a sensor on a circuit board 38, which will be further described in reference to motor 20's control system. Light source 29 is preferably a light emitting diode (LED); however other light sources can be substituted as is known in the art. Similarly, other signal sources can be used such as Hall effect sensor technology, infrared sensor technology, and ultraviolet light technology, as is known in the art.

Motor 20 also comprises a rotor. The rotor comprises a substantially annular rotor disk 35 located between stator housing 25 and stator housing 26, as illustrated in FIGS. 3 and 4. Rotor disk 35 rotates about its center and is preferably approximately 5 mm in thickness. Bearing holes 43 (shown in detail in FIG. 4) surround the rotational axis of the rotor disk 35 to accommodate ball bearings 33. A first support piece 31 and a second support piece 32 correspond with bearing holes 43 and are positioned on each side of the rotor to keep bearings 33 confined within the bearing holes 43. Ball bearings 33 also cooperate with the bearing tracks on first and second stators 25 and 26.

A first plurality of permanent magnets 34 are mounted in spaced relation around the circumference of first rotor side 8 of rotor disk 35. Similarly, a second plurality of magnets 36 are mounted in spaced relation around the circumference of second rotor side 9 of rotor disk 35. In both the first plurality of permanent magnets 34 and the second plurality of magnets 36, the magnets are preferably wedge-shaped, or similar to a truncated pie-shape, although other shapes for the magnets are acceptable. Preferably, the magnets are composed of neodymium, iron and boron ($Nd_2Fe_{14}B$), grade 50, and coated with nickel. Alternatively, any grade between 40 and 50 is preferred, and the magnets can also be coated with metallic zinc, nickel and nickel, copper and nickel, nickel and copper and nickel, gold, organic epoxy, or nickel and epoxy. The magnets are preferably secured with adhesive to rotor disk 35. The magnets on the first and second rotors are referred to herein collectively as rotor magnets.

Preferably there are equal numbers of rotor magnets on each side of rotor disk 35, and the pluralities of magnets 34 and 36 are arranged so that the permanent magnets alternate polarity. Additionally, the number of rotor magnets is not equal in number to the number of stator winding coils. Any number of rotor magnets and stator winding coils can be used, as long as there remain an asymmetric number of magnets and poles. Preferably there is always one more or one less rotor magnets than stator winding coils such that there is an odd/even relationship between the magnets and stator coils, however the difference could also be two or more. For example, if the plurality of magnets 34 comprises n magnets, then the plurality of winding coils 27 comprises n±x winding coils. Therefore, if n equals 25 and x equals 1, there are 25 magnets and either 24 or 26 winding coils. Preferably, there is a very small misalignment, such as a 0.1 mm difference, between the magnets and the winding coils due to the asymmetric number of magnets and winding coils. By using an asymmetric number of poles, cogging torque is minimized when power is turned off to motor 20 and a bicycle rider will experience a smooth deceleration.

FIG. 4 illustrates rotor disk 35 in particular. In addition to bearing holes 43 for bearings 33, rotor disk 35 comprises magnet position identifiers. As shown in FIG. 4, magnet position identifiers in the preferred embodiment comprise patterns of apertures 42. The patterns of apertures 42 identify magnet alignment and represent magnet identification numbers for each magnet on rotor disk 35. Preferably, each pattern is a column of apertures located directly below the midpoint of each magnet on rotor disk 35. As a result, concentric circles, rather than rows, of openings result, as is shown in FIG. 4. Preferably, the patterns of apertures 42 are arranged in binary patterns for each column to minimize space.

As shown in the figures, rotor disk 35 is generally annular in shape with a rotor gap 6 similar to first stator 25 and first stator gap 5 and second stator 26 and second stator gap 7. Rotor gap likewise enables the motor to be fitted around an axle and to be easily removed. In the preferred embodiment, rotor gap 6 approximately corresponds in size to the amount of space that two magnets would occupy. In an alternative embodiment of the rotor, it can be coated to prevent contamination and rusting.

Figure 3B:
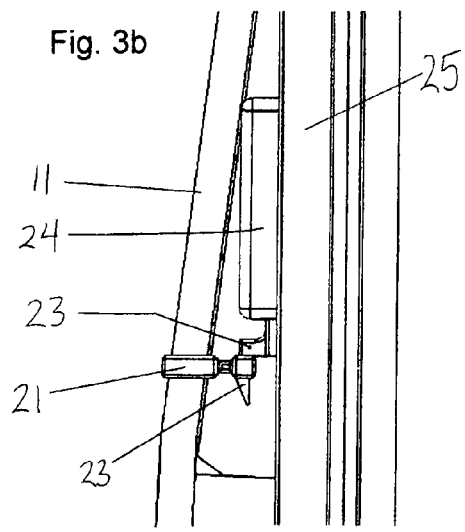
FIG. 3b is an illustration of the motor-to-frame connector.
Figure 4:
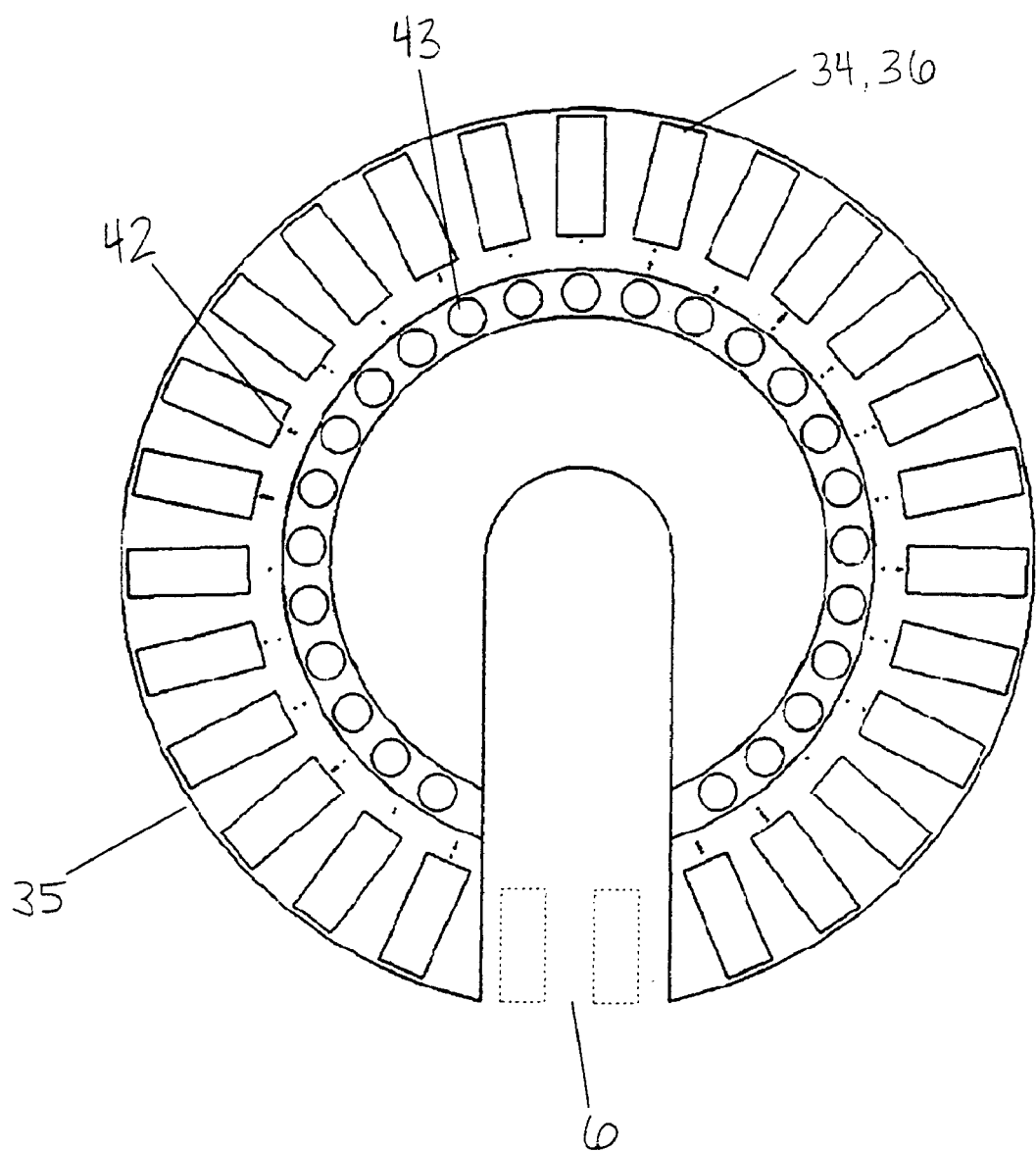
FIG. 4 is a sectional view of a rotor, showing apertures positioned to identify magnet alignment for each magnet on the rotor.

FIG. 3b illustrates the motor-to-frame connector used to stabilize the stator as the rotor rotates. The motor-to-frame connector includes a stator connector 23 that cooperates with a frame connector 21. Frame connector 21 attaches to frame 11 and includes a slot for receiving stator connector 23. Frame connector 21 can be attached to frame 11 with screws, nuts, adhesive, or welding. Preferably, frame connector 21 is attached by brackets and screws. Frame connector 21 preferably remains secured to frame 11 when motor 20 is removed from the bicycle.

Stator connector 23 can be attached to either stator housing as long as it is attached to the stator housing that is adjacent frame 11 and frame connector 21. In the preferred embodiment, stator connector 23 attaches to second stator housing 26 near or along with control box 24. Stator connector 23 can be secured to the stator housing with fasteners or adhesive. Preferably, however, stator connector 23 is attached by welding it to the second stator housing. Stator connector 23 includes a clip that can be inserted in the slot of frame connector 21 such that the clip snaps into the slot and thereby removably secures to frame 11 the stator housing and the motor components not intended to rotate. Other methods of securing one of the stator housings to frame 11 can be used as well, as will be known to someone skilled in the art.

Figure 3C:
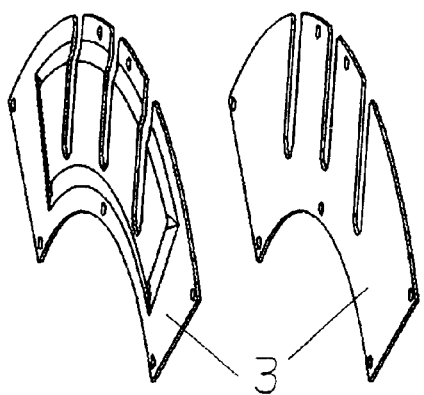
FIG. 3c is an illustration of the wheel connector portion of the motor-to-wheel connector.

FIGS. 3a and 3c illustrate the motor-to-wheel connector used to cause the bicycle wheel to rotate when rotor 35 rotates. As shown in FIG. 3a, rotor disk 35 includes a rotor connector 22 with two sections 22a and 22b that is preferably permanently secured to rotor disk 35 on rotor disk's side adjacent first stator housing 25. Sections 22a and 22b can be one piece, or they can be two pieces attached together. Rotor connector 22 then extends beyond first stator housing 25 without interfering with the operation of first stator 25 such that when rotor disk 35 and rotor connector 22 rotate, first stator 25 remains substantially stationary. Rotor connector 22 can alternatively be placed on the other side of rotor disk 35 as long as it extends towards the spokes of the bicycle wheel when motor 20 is installed on bicycle 10. In the preferred embodiment, rotor connector 22 is welded to rotor disk 35. Other means of attaching rotor connector 22 to rotor disk 35, such as fasteners or adhesive, can be used as is known in the art. Rotor connector also preferably includes one or more protrusions, such as pins, that cooperate with a wheel connector 3.

FIG. 3c illustrates wheel connector 3. Wheel connector 3 is preferably two small plates with one or more U-shaped channels for cooperating with the protrusions on rotor connector 22. The two plates are secured on either side of one or more spokes such that the spokes are sandwiched between the two plates. The two plates are then secured to each other with fasteners such as screws. Once the two plates are secured together, the protrusions 4 of wheel connector 22 can be removably inserted in the channels of wheel connector 3. Additionally, more than one pair of plates can be installed on the rear wheel, so that the user doesn't have to rotate the wheel a full revolution to plug in the motor in certain situations.

Other methods of removably attaching the rotor to the wheel structure of a bicycle can be used as well, as will be known to someone skilled in the art.

Figures 5, 6:
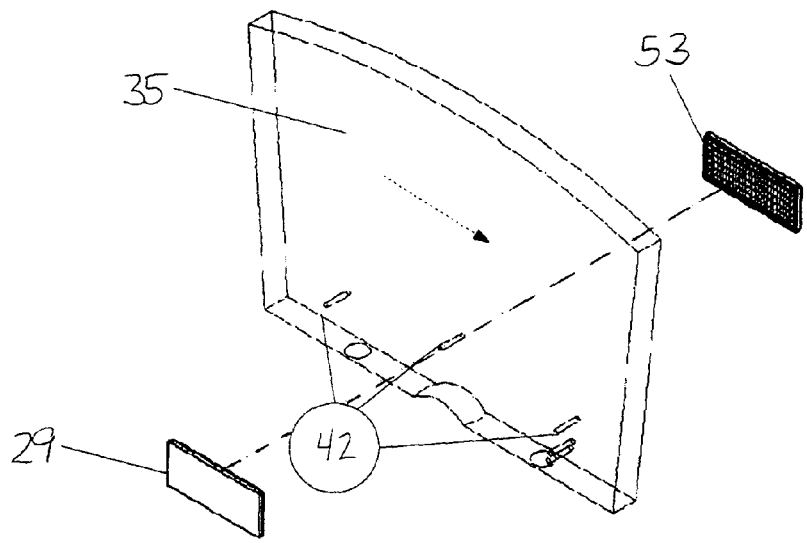
FIG. 5 is a partial sectional view of a sensor and a light source across the rotor.
FIG. 6 illustrates examples of aperture arrangements.

FIG. 5 is a partial sectional view of a sensor 53 and a light source 29 that directs light across rotor disk 35. As described earlier, light source 29 is preferably an LED. Sensor 53 is preferably a charged couple device, a complementary metal oxide semiconductor or CMOS sensor, or any sensor with pixel arrays. Light from light source 29 passes through the patterns of apertures 42 and reaches the sensor 53 on the other side of the rotor disk 35 as the rotor rotates. Examples of patterns of apertures 42 arranged to identify different magnets are illustrated in FIG. 6.

As shown in FIG. 6, in the preferred embodiment, each magnet on rotor disk 35 can be identified with a number from 1 through 25, by using binary code patterns created by the columns of apertures under each magnet. The apertures allow light to pass, or with other signal sources cause a difference in signal strength. For example, magnet number 2 has an aperture pattern 42 with an aperture on the second ring, which corresponds to binary number 00010, or 2. Similarly, magnet number 12 has an aperture pattern 42 with apertures on the third ring and the fourth ring, which corresponds to binary number 01100, or 12. Magnet number 19 has apertures on the first ring, second ring and the fifth ring, which corresponds to binary number 10011, or 19. When rotor gap 6 passes by the sensor, all apertures allow light to pass, so that rotor gap 6 is recorded as binary number 11111.

The binary numbers created by the patterns of apertures 42 and light source 29 are processed by sensor 53. FIG. 7 illustrates the relationship between the light signals formed by the patterns of apertures 42 and the position of the magnets on rotor disk 35. As shown in Tables (a)-(d) of FIG. 7, sensor 53 has pixels divided into rows proportional to the number of magnets 34 and 36 in binary and columns proportional to the number of winding coils 27 and 28. In the preferred embodiment, there are 24 windings and 25 magnets. Accordingly, the sensor is divided into 26 columns, 24 windings plus 2 for the space the stator gap occupies 26=24+2, and five rows, 25 magnets plus 2 for the space the rotor gap occupies 27=25+2 represented in binary. The binary pattern having five rows can support up to 31 magnets. In Table (a), the first magnet $2^0$ is detected in column 3 because a pixel is illuminated in the first row of the third column. In Table (b), the tenth magnet $2^1+2^3$ is detected in column 18 because pixels are illuminated in the second and fourth rows of the eighteenth column. In Table (c), the twenty-fifth magnet $2^0+2^3+2^4$ is detect in column 20 because the first, fourth and fifth rows are illuminated in the twentieth column. In Table (d), rotor gap 6 is detected in columns 1-6, because all of the pixels are illuminated in those columns. The placement of the binary pattern and the matrix sensor allows detection of all magnet positions in one location with a single sensor as opposed to multiple line sensors on each stator, which significantly reduces the amount of wiring necessary.

Figure 8:
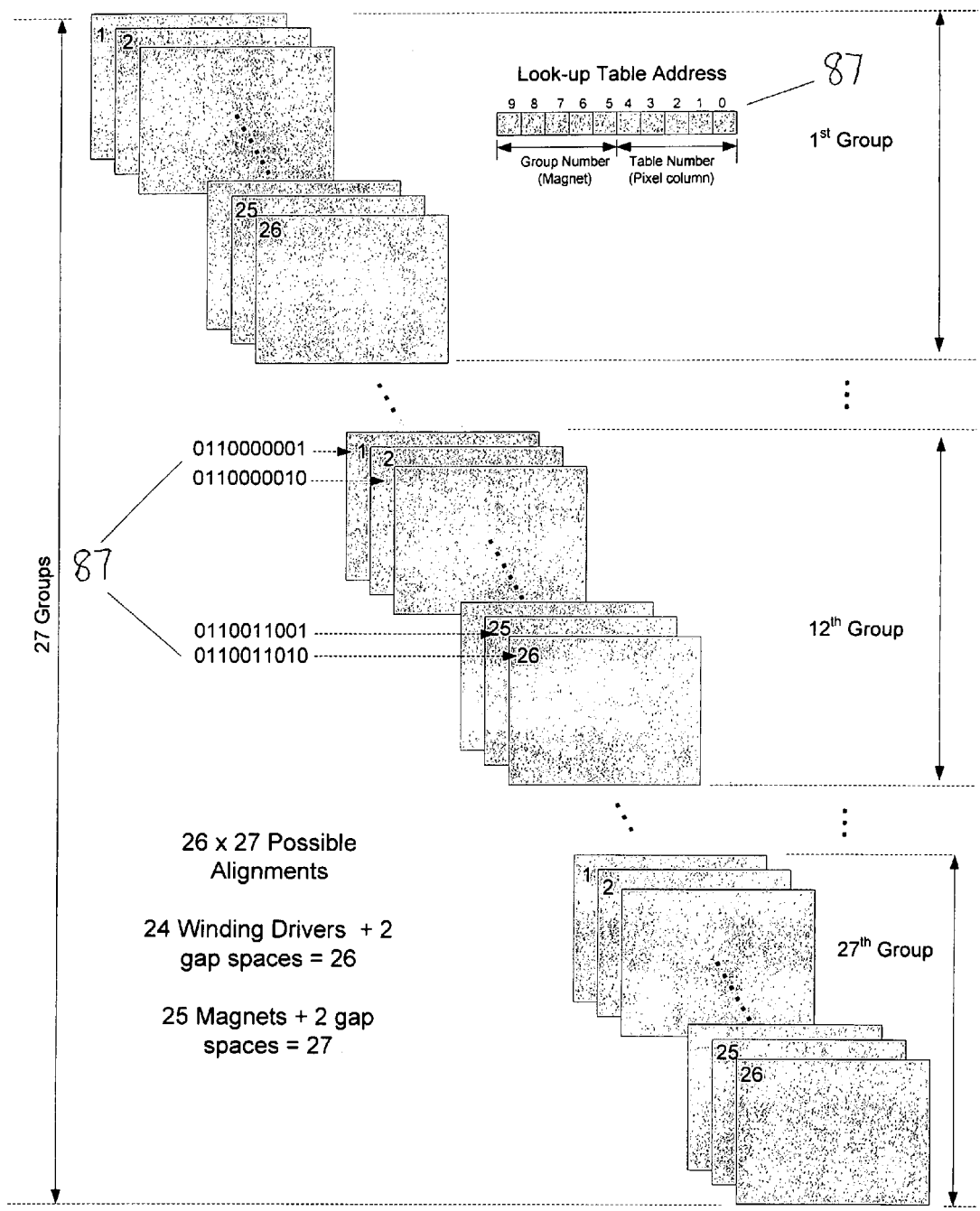
FIG. 8 illustrates real-time rotor position lookup tables.

FIG. 8 illustrates real-time rotor position lookup tables. In the preferred embodiment, the look-up table address 87 is made up of 2 segments. The first segment is the Group Number and the second segment is the Table Number. This address is used to look up the corresponding table that stores a predetermined set of output values for each winding driver. For example, when magnet 1 reaches sensor column 1, the look-up table address is 0000100001. Magnet 1 at sensor column 2 is 0000100010. Magnet 2 at sensor column 1 is 0001000001. When the rotor and stator gaps reach sensor column 1 look-up table address becomes 1111100001.

Figure 9:
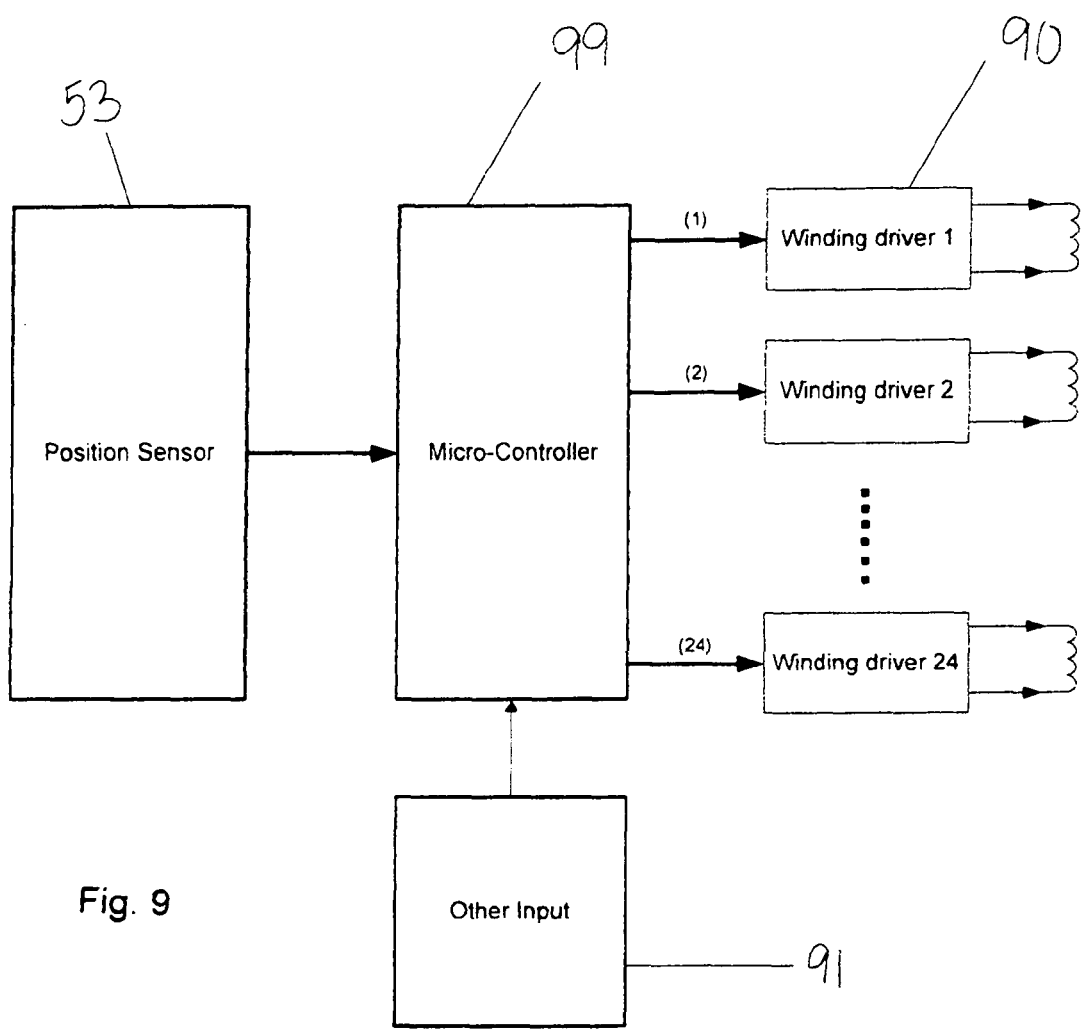
FIG. 9 is a circuit block diagram of a motor control circuit system of the present invention.

FIG. 9 is a circuit block diagram of a motor control circuit system of the present invention. The main components of the control system comprise a multiple core microcontroller 99, input from the position sensor 53, input from the throttle and other optionally other sources 91, and output to winding drivers 90 for each of the winding coils 27 and 28. In the preferred embodiment, microcontroller 99 is a 32 bit microcontroller from ST Microelectronics, model number STR730FZ2T7. The microcontroller can be a multiple core microcontroller. Preferably each winding coil has its own winding driver, and microcontroller 99 generates a switch-timing signal and voltage value signal, which is described in the lookup tables, for each individual winding driver 90. Microcontroller 99 takes the input from sensor 53, determines which pixels are illuminated, and then computes a look-up table address to perform a search. Microcontroller 99 includes tables of predetermined output signal values for each situation and for each winding driver. Using the look-up table address 87, microcontroller 99 finds the corresponding table and sends individual output signals to the appropriate winding drivers 90. This process is repeated as rotor 35 rotates. Preferably, the throttle 17 with throttle input 91 instructs the microcontroller 99 as to the magnitude of the output signal sent to the winding coils based on the values provided by the lookup table of that particular situation, thereby controlling speed, performing a real-time optimization algorithm. Because each winding driver 90 generates the output current that is controllable by the microcontroller 99 to the appropriate windings among the plurality of windings 27 and 28, motor 20 can operate at maximum efficiency at any given speed and electromagnetic interference is reduced when power is switched on and off.

Figure 10:
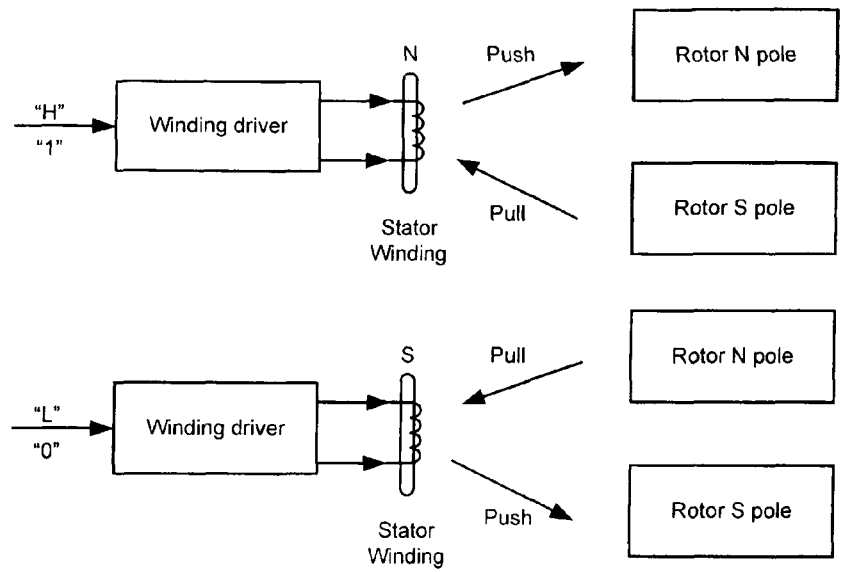
FIG. 10 illustrates the relationship between a control signal to the winding driver, magnet polarity of the stator and forces acting on the rotor

FIG. 10 illustrates the relationship between a control signal to the winding driver, magnet polarity of the stator and forces acting on the rotor. Preferably, when the control signal from microcontroller 99 is set to high, or 1, the polarity of the winding becomes North. When the control signal from the microcontroller 99 is set to low, or 0, the polarity of the winding becomes South.

Figure 11:
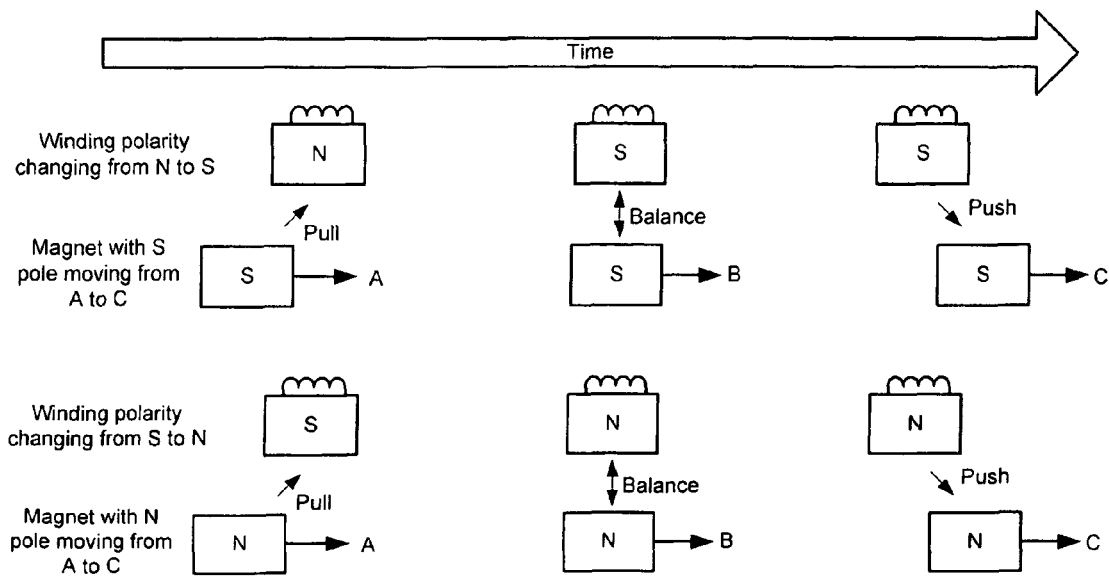
FIG. 11 illustrates the relationship between the position and polarity of magnet on the rotor and the corresponding stator winding polarity.

FIG. 11 illustrates the relationship between the position and polarity of a magnet on rotor disk 35 and the corresponding stator winding polarity. Data from sensor 53 and the lookup table tells the winding drivers how to operate. When a magnet approaches a winding coil, the winding coil switches immediately to the opposite polarity, creating an attractive, or pulling, force. When the magnet and winding are aligned, the winding quickly switches to the same polarity as the magnet thus creating a repulsive force, pushing the magnet in the direction of the current. Sensor 53 and the control system are essential in determining the position changes and operating the winding drivers accordingly. In this fashion, the motor causes the rear wheel to rotate in relatively precise response to the output signals, propelling the bicycle efficiently.

In an alternative embodiment of the control circuit, the microcontroller can be programmed and can be accessed with a USB port for firmware upgrades. Additional user programmable functions can be programmed and statistical information can be logged. For example, the microcontroller can be programmed to perform diagnostic functions or determine energy consumption profiles. In other embodiments, the microcontroller can cause the motor to operate in different modes, such as "quiet mode," "burst mode," "energy saver mode," "city mode," or "normal mode."

Additional features can be included with the overall conversion system in alternative embodiments as well. For example, the conversion system may include security features such biometric authentication or warning features such as water damage or low battery indicators. The conversion system also can include regenerative braking, accelerometer orientation devices, route detection or terrain assessment features, or global positioning systems.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

I claim:

1. An electric motor for converting a vehicle with a wheel structure to an electric vehicle comprising:
   a. a rotor comprising a first plurality of magnets mounted to a first rotor side, a second plurality of magnets mounted to a second rotor side, and a rotor gap;
   b. a first stator adjacent the first rotor side and comprising a first plurality of winding coils and a first stator gap;
   c. a second stator adjacent the second rotor side and comprising a second plurality of winding coils and a second stator gap;
   d. a connector for removably attaching the motor to a wheel structure such that the wheel rotates when the rotor rotates;
   e. a connector for removably attaching the motor to a frame structure such that the second stator remains substantially stationary when the rotor rotates; and
   f. a direct current power source electrically connected to the first stator and second stator; and
   wherein the first plurality of winding coils comprises a different number of winding coils than the first plurality of magnets comprises magnets, and wherein the second plurality of winding coils comprises a different number of winding coils than the second plurality of magnets comprises magnets; and
   wherein the first plurality of magnets comprises n magnets, wherein the second plurality of magnets comprises n magnets, wherein the first plurality of winding coils comprises n ±1 winding coils, and wherein the second plurality of winding coils comprises n ±1 winding coils.

2. An electric motor for converting a vehicle with a wheel structure to an electric vehicle comprising:
   a. a rotor comprising a first plurality of magnets mounted to a first rotor side, a second plurality of magnets mounted to a second rotor side, and a rotor gap;
   b. a plurality of magnet position identifiers positioned on the rotor wherein the magnet position identifiers comprise a plurality of apertures integral with the rotor such that signals can pass through the apertures;
   c. a first stator adjacent the first rotor side and comprising a first plurality of winding coils, a first stator gap, and a signal source that directs signals toward the rotor;
   d. a second stator adjacent the second rotor side and comprising a second plurality of winding coils and a second stator gap;
   e. a connector for removably attaching the motor to a wheel structure such that the wheel rotates when the rotor rotates;
   f. a connector for removably attaching the motor to a frame structure such that the second stator remains substantially stationary when the rotor rotates;
   g. a direct current power source electrically connected to the first stator and second stator; and
   h. a control system electrically connected to the power source, first stator, and second stator that processes information from the rotor position identifiers, wherein the control system comprises a sensor that receives the signals from the signal source after the signals have passed through the apertures.

3. The electric motor of claim 2 wherein the first plurality of magnets comprises n magnets, wherein the second plurality of magnets comprises n magnets, and wherein the plurality of apertures comprises n patterns of apertures.

4. The electric motor of claim 3 wherein the patterns of apertures create binary code patterns.

5. The electric motor of claim 2 wherein the control system further comprises a microcontroller and a plurality of winding drivers electrically connected to the first plurality of winding coils and to the second plurality of winding coils and wherein the microcontroller processes information from the sensor and individually controls winding coils among the first plurality of winding coils and the second plurality of winding coils in response to the information received from the sensor.

6. An electric motor for converting a vehicle with a wheel structure to an electric vehicle comprising:
   a. a rotor comprising a first plurality of magnets mounted to a first rotor side, a second plurality of magnets mounted to a second rotor side, and a rotor gap;
   b. a first stator adjacent the first rotor side and comprising a first plurality of winding coils and a first stator gap;
   c. a second stator adjacent the second rotor side and comprising a second plurality of winding coils and a second stator gap;
   d. a connector for removably attaching the motor to a wheel structure such that the wheel rotates when the rotor rotates;
   e. a connector for removably attaching the motor to a frame structure such that the second stator remains substantially stationary when the rotor rotates;
   f. a direct current power source electrically connected to the first stator and second stator:
   g. a detachable motor cover partially enclosing the first stator, the second stator, and the rotor;
   h. a plurality of bearing holes extending from the first rotor side to the second rotor side and a plurality of ball bearings situated in the plurality of bearing holes;
   i. a signal source attached to the first stator such that signals are directed towards the rotor;
   j. a plurality of apertures in the rotor such that the signals from the signal source can pass through the apertures; and
   k. a control system electrically connected to the first stator and second stator comprising:
      i. a sensor disposed near the second stator for receiving signals passed through the apertures; and
      ii. a microcontroller electrically connected to the sensor for processing the information received by the sensor and controlling the operation of the motor.

7. An electric motor conversion system for converting a manually powered vehicle with a wheel structure to an electric vehicle comprising:
   a. a throttle;
   b. a direct current power source; and
   c. an electric motor in electrical communication with the throttle and the power source comprising:
      i. a rotor comprising a first plurality of magnets mounted on a first rotor side, a second plurality of magnets mounted on a second rotor side, and a rotor gap, ii. a first stator adjacent the first rotor side and comprising a first plurality of winding coils and a first stator gap, iii. a second stator adjacent the second rotor side and comprising a second plurality of winding coils and a second stator gap;

iv. a connector for removably attaching the motor to a wheel structure such that the wheel rotates when the rotor rotates;

v. a connector for removably attaching the motor to a frame structure such that the second stator remains substantially stationary when the rotor rotates; and vi. a plurality of magnet position identifiers positioned on the rotor;

vii. a control system electrically connected to the power source, first stator, and second stator that processes information from the magnet position identifiers; and wherein the first plurality of winding coils comprises a different number of winding coils than the first plurality of magnets comprises magnets, and wherein the second plurality of winding coils comprises a different number of winding coils than the second plurality of magnets comprises magnets; and wherein the first plurality of magnets comprises n magnets, wherein the second plurality of magnets comprises n magnets, wherein the first plurality of winding coils comprises n ±1 winding coils, and wherein the second plurality of winding coils comprises n ±1 winding coils.

8. An electric motor conversion system for converting a manually powered vehicle with a wheel structure to an electric vehicle comprising:

a. a throttle;

b. a direct current power source; and c. an electric motor in electrical communication with the throttle and the power source comprising:

i. a rotor comprising a first plurality of magnets mounted on a first rotor side, a second plurality of magnets mounted on a second rotor side, and a rotor gap, ii. a plurality of magnet position identifiers positioned on the rotor, wherein the magnet position identifiers comprise a plurality of apertures in the rotor such that signals can pass through the apertures;

iii. a first stator adjacent the first rotor side and comprising a first plurality of winding coils, a first stator gap and a signal source that directs signals toward the rotor;

iv. a second stator adjacent the second rotor side and comprising a second plurality of winding coils and a second stator gap;

v. a connector for removably attaching the motor to a wheel structure such that the wheel rotates when the rotor rotates;

vi. a connector for removably attaching the motor to a frame structure such that the second stator remains substantially stationary when the rotor rotates; and vii. a control system electrically connected to the power source, first stator, and second stator that processes information from the magnet position identifiers, wherein the control system comprises a sensor that receives signals from the signal source after it has passed through the apertures.

9. The electric motor conversion system of claim 8 wherein the first plurality of magnets comprises n magnets, wherein the second plurality of magnets comprises n magnets, and wherein the plurality of apertures comprises n patterns of apertures.

10. The electric motor conversion system of claim 9 wherein the patterns of apertures create binary code patterns.

11. The electric motor conversion system of claim 8 wherein the control system further comprises a microcontroller and a plurality of winding drivers electrically connected to the first plurality of winding coils and the second plurality of winding coils and wherein the microcontroller processes information from the sensor and from the throttle and individually controls winding coils among the first plurality of winding coils and the second plurality of winding coils in response to the information received from the sensor and the throttle.

* * * * *